No. 653,740. Patented July 17, 1900.
W. M. JEWELL.
METHOD OF PURIFYING WATER.
(Application filed June 29, 1898.)
(No Model.)
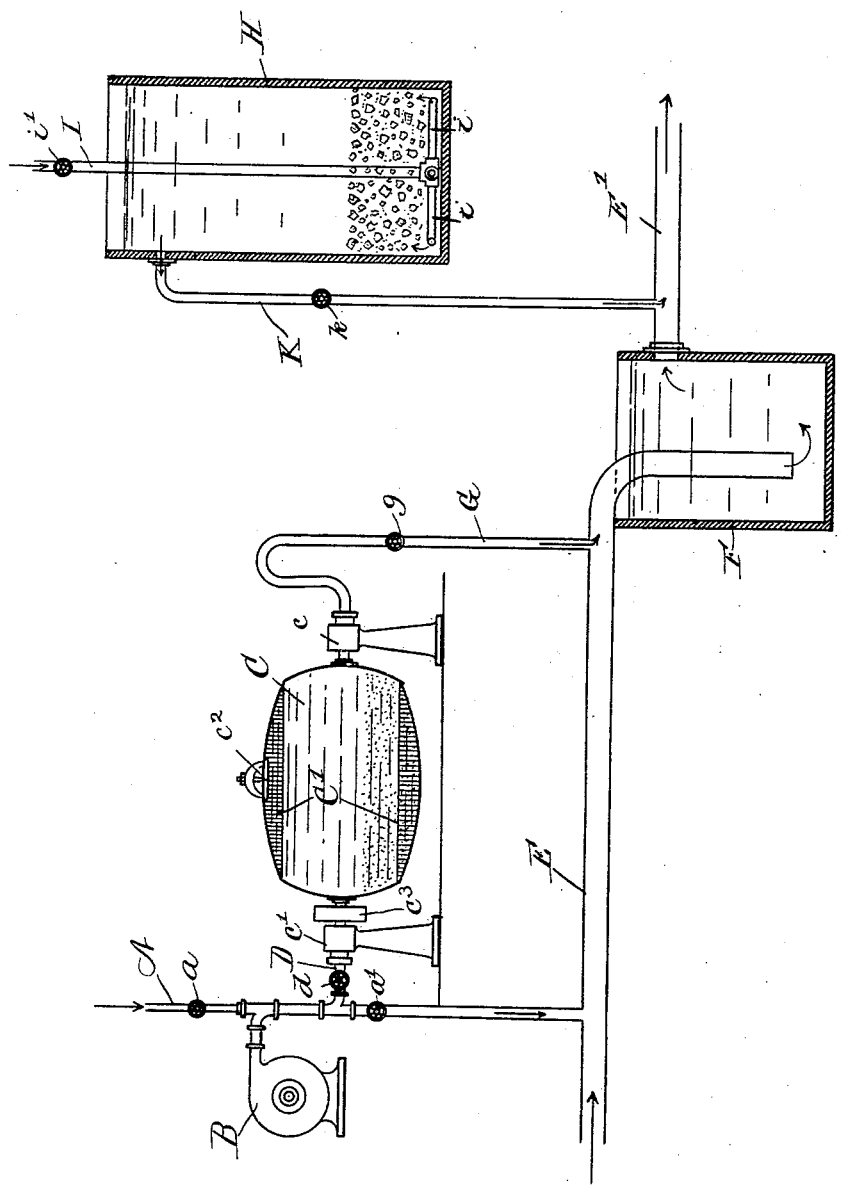

UNITED STATES PATENT OFFICE.

WILLIAM M. JEWELL, OF CHICAGO, ILLINOIS.

METHOD OF PURIFYING WATER.

SPECIFICATION forming part of Letters Patent No. 653,740, dated July 17, 1900.

Application filed June 29, 1898. Serial No. 684,769. (No specimens.)

*To all whom it may concern:*

Be it known that I, WILLIAM M. JEWELL, a citizen of the United States of America, residing at Chicago, in the county of Cook, in the State of Illinois, have discovered and invented certain new and useful Improvements in Methods of Producing Coagulation, of which the following is a description.

This invention has for its principal object the production of coagulation or coalescence of suspended matters in waters or other liquids, whereby such matters are more easily retained upon or in a filtering-bed or deposited by sedimentation or eliminated by a method combining both sedimentation and filtration.

My improved process is also capable of removing many other impurities or substances—such, for example, as the organic matter, free ammonia, bacteria, lime, magnesia, &c.—generally present in natural waters, sewage, &c. It is more especially applicable to the purification of water in large quantities for municipal and manufacturing purposes and, in general, all purposes requiring large quantities of water.

In practicing my invention any suitable apparatus may be employed, that shown and hereinafter described being preferred because of its simplicity and small cost.

Natural waters vary in their character and the matter and chemicals carried by them. Freshets and droughts seem to be the greatest causes of variance, although in some cases other causes enter into consideration. Thus some waters at certain seasons of the year contain quantities of carbonic-acid gas, lime, magnesia, free ammonia, bacteria, &c., as well as the matter causing turbidity—vegetable matter, clay, &c. It will therefore be understood that the intelligent employment of my improved process contemplates an understanding of the condition of the water before treatment. This is usually determined by the tests ordinarily employed for that purpose.

My invention consists in introducing into the water to be purified or into a separate body of water, which is subsequently added to the water to be purified, carbonic-acid gas and iron, (or its equivalent,) which react to form carbonate of iron, which is then precipitated as hydrate, thereby agglomerating or carrying down the impurities in the water. The best results are usually obtained by first subjecting metallic iron to the action of carbonic-acid gas in water and then conducting the resulting solution into the water to be purified. The formation of the hydrate from the carbonate is secured either by the action of oxygen, free ammonia, or other alkalies contained in the water treated, or where such water does not contain a sufficient quantity of such substances by introducing lime or milk of lime. The result is a copious precipitate of hydrate of iron, which is a very efficient coagulent and by its action renders the impurities of the water susceptible of removal by filtration or sedimentation. An excess of carbonic-acid gas should not be used, as when used in excess it promotes solution of the iron precipitate.

Referring now to the drawing submitted herewith, A is a water-pipe provided with the valves $a$ $a'$.

B is a blower or fan adapted to connect with a stack, chimney, or other source of supply for the carbonic-acid gas and to receive and force the same onward through the pipe A or otherwise, as hereinafter described.

C is a mixing-chamber which is preferably rotatable in the bearings $c$ $c'$ and provided with means for charging the same, as by the gated opening $c^2$.

$c^3$ is a pulley by means of which the chamber may be rotated. The pipe D connects with the pipe A and with the mixing-chamber. The valve $d$ controls the entrance to the mixing-chamber.

E is the main water-supply pipe, preferably discharging into the well F. The pipe A connects with the pipe E, as shown, while the pipe G connects the mixing-chamber with the pipe E, the valve $g$ controlling the pipe G.

H is a chamber for the lime, the water-pipe I conducting the water preferably to the bottom of said chamber, from whence it rises and finally escapes by means of the pipe K into the pipe E', which is a continuation of the main pipe E, and conducts the water to the sedimentation tank or filter. The water through the pipe I is preferably discharged at a plurality of points through the pipes $i$ at the bottom of the tank H, as shown. The valves $i'$ and $k$ control the passage of water through the pipes I and K.

The mode of operation is as follows: The valves $a$, $d$, and $g$ are open and the valve $a'$ closed, and the blower is put in operation, drawing the carbonic-acid gas from a suitable source and forcing the same into the fluid passing through the pipe A into the pipe E and thence through the well F, where the excess of gas may escape, and onward through the pipe E', where the lime needed to complete the operation is added to the fluid through the pipe K, the valves $k$ and $i'$ being open to permit the passage through the tank H for that purpose, thence to the filter or sedimentation tank. (Not shown.) In cases where iron is to be used the valve $a'$ is closed and the valves $d$ and $g$ open. The carbonic-acid gas is conducted to the mixing-chamber C, which in order to insure the most complete action is provided with suitably-arranged carrying-boards C' C', which carry the iron well up the sides and permit it to drop back, insuring the most complete reaction between the gas and iron. The fluid thus charged with carbonic-acid gas and the iron solution formed is conducted to the pipe E, as shown, thence to the well F, and onward to the pipe E', receiving, if desired, a sufficient quantity of the lime on its passage, as before described. In cases where the water carries large quantities of lime, oxygen, alkalies, or free ammonia it may not be necessary to supply any further quantity of lime or other precipitant. The chemical equations of these several processes are substantially as follows:

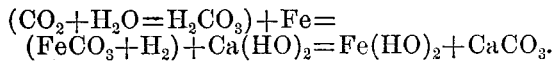
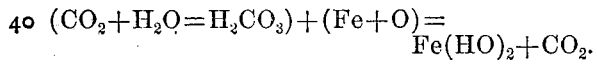

The ferrous hydrate in both the first and the second equation rapidly changes in the presence of dissolved oxygen to ferric hydrate. Thus:

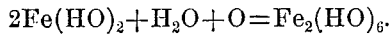

Although the apparatus shown contemplates the preliminary treatment of a portion of the water with the carbonic-acid gas or carbonate of iron, it is obvious that, if preferred, all the water may be thus treated instead of a portion without in any way departing from the spirit of my invention. It is also obvious that many modifications may be suggested to the apparatus here shown, and consequently I do not intend to be understood as limiting myself to such apparatus. Neither do I limit myself to the form in which these reagents are applied, as it is obvious that the iron carbonate may be precipitated by other reagents which act as equivalents for the lime, and therefore I do not desire to be limited to the use of said reagent only for that purpose.

Having thus described my invention and one simple apparatus for carrying the same into effect, what I claim as new, and desire to secure by Letters Patent, is—

1. The method of producing coagulation which consists in generating carbonic-acid gas, conducting it into water, subjecting iron to the action of the carbonic-acid gas and water and then converting the resulting product to a hydrate, substantially as described.

2. The method of producing coagulation which consists in generating carbonic-acid gas, conducting it into water, subjecting iron to the action of the carbonic-acid gas and water and afterward introducing the solution of the salt so produced into the water to be treated, substantially as described.

3. The method of producing coagulation which consists in generating carbonic-acid gas, conducting it into water, subjecting iron to the action of the carbonic-acid gas and water, introducing the solution of the salt so produced into the water to be treated and adding a precipitating agent to the solution of the salt, substantially as described.

4. The method of producing coagulation which consists in generating carbonic-acid gas, conducting it into water, subjecting iron to the action of the carbonic-acid gas and water, and adding a suitable alkaline reagent to the resulting salt of iron, substantially as described.

5. The method of producing coagulation which consists in generating carbonic-acid gas, conducting it into water, subjecting iron to the action of the carbonic-acid gas and water, and adding hydrate of lime to the resulting salt of iron, substantially as described.

WILLIAM M. JEWELL.

Witnesses:
JOHN W. HILL,
LEONORA WISEMAN.